United States Patent
Chang

(10) Patent No.: US 10,740,244 B2
(45) Date of Patent: Aug. 11, 2020

(54) MEMORY SYSTEM INCLUDING A REDIRECTOR FOR REPLACING A FAIL MEMORY DIE WITH A SPARE MEMORY DIE

(71) Applicant: Sil-wan Chang, Yongin-si (KR)

(72) Inventor: Sil-wan Chang, Yongin-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 6 days.

(21) Appl. No.: 15/711,196

(22) Filed: Sep. 21, 2017

(65) Prior Publication Data

US 2018/0150401 A1 May 31, 2018

(30) Foreign Application Priority Data

Nov. 30, 2016 (KR) ........................ 10-2016-0162304

(51) Int. Cl.
| | |
|---|---|
| *G06F 12/0891* | (2016.01) |
| *G06F 11/14* | (2006.01) |
| *G06F 12/02* | (2006.01) |
| *G06F 11/20* | (2006.01) |
| *G06F 11/10* | (2006.01) |

(52) U.S. Cl.
CPC ........ *G06F 12/0891* (2013.01); *G06F 11/142* (2013.01); *G06F 11/2017* (2013.01); *G06F 12/0246* (2013.01); *G06F 11/1076* (2013.01); *G06F 2212/1032* (2013.01); *G06F 2212/1044* (2013.01); *G06F 2212/7201* (2013.01); *G06F 2212/7204* (2013.01); *G06F 2212/7208* (2013.01)

(58) Field of Classification Search
None
See application file for complete search history.

(56) References Cited

U.S. PATENT DOCUMENTS

| | | | |
|---|---|---|---|
| 7,679,133 | B2 | 3/2010 | Son et al. |
| 8,553,466 | B2 | 10/2013 | Han et al. |
| 8,559,235 | B2 | 10/2013 | Yoon et al. |
| 8,654,587 | B2 | 2/2014 | Yoon et al. |
| 8,677,055 | B2 | 3/2014 | Ouye et al. |
| 9,195,588 | B2 | 11/2015 | Cepulis |

(Continued)

*Primary Examiner* — Charles Rones
*Assistant Examiner* — Jonah C Krieger
(74) *Attorney, Agent, or Firm* — Harness, Dickey & Pierce, P.L.C.

(57) ABSTRACT

A memory system includes a first and a second flash domain, a domain distributor, and a first redirector. The first and second flash domains includes first and second spare memory dies, respectively. The domain distributor is configured to generate a first logical address corresponding to first data and to generate a second logical address corresponding to second data. The first redirector is configured to receive the first data and the second data from the domain distributor and to respectively provide the first data and the second data to the first flash domain and the second flash domain. The first redirector is configured to provide a part of the second data corresponding to a first fail memory die to the first flash domain, if the second flash domain include the first fail memory die, such that the first redirector replaces the first fail memory die with the first spare memory die.

19 Claims, 12 Drawing Sheets

(56) References Cited

U.S. PATENT DOCUMENTS

| | | |
|---|---|---|
| 2007/0283079 A1* | 12/2007 | Iwamura ............... G11C 16/349 711/103 |
| 2010/0162037 A1* | 6/2010 | Maule ................... G06F 11/106 714/5.11 |
| 2011/0233468 A1 | 9/2011 | Zong et al. |
| 2012/0079174 A1* | 3/2012 | Nellans ............... G06F 12/0246 711/103 |
| 2014/0143593 A1 | 5/2014 | Strauss et al. |
| 2014/0157085 A1 | 6/2014 | Shalvi et al. |
| 2014/0281138 A1* | 9/2014 | Karamcheti ........ G06F 12/0246 711/103 |
| 2015/0039813 A1 | 2/2015 | Hsu et al. |
| 2015/0067244 A1 | 3/2015 | Kruger |
| 2015/0067245 A1 | 3/2015 | Kruger |
| 2015/0082124 A1 | 3/2015 | Tang et al. |
| 2015/0324264 A1 | 11/2015 | Chinnakkonda Vidyapoornachary et al. |
| 2015/0370670 A1 | 12/2015 | Lu |
| 2016/0299814 A1* | 10/2016 | Shalvi ..................... G06F 11/14 |

\* cited by examiner

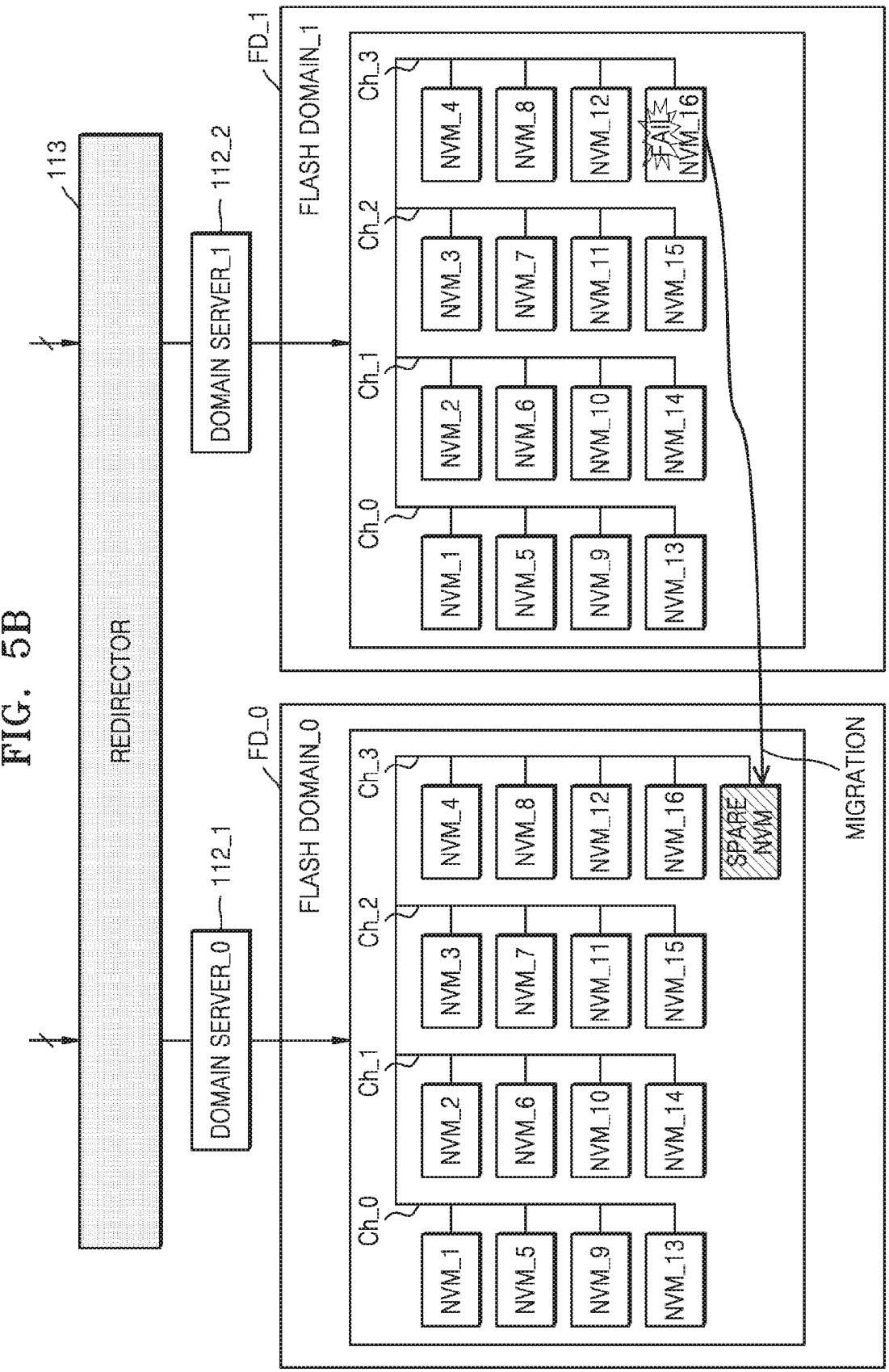

MEMORY SYSTEM INCLUDING A REDIRECTOR FOR REPLACING A FAIL MEMORY DIE WITH A SPARE MEMORY DIE

CROSS-REFERENCE TO RELATED APPLICATION

This application claims priority under 35 U.S.C. § 119 to Korean Patent Application No. 10-2016-0162304, filed on Nov. 30, 2016, in the Korean Intellectual Property Office, the disclosure of which is incorporated herein in its entirety by reference.

BACKGROUND

Inventive concepts relate to a memory system, and more particularly, to a memory system including a redirector capable of replacing a fail memory die with a spare memory die.

In the information society, the amount of data to be stored and carried by an individual is rapidly increasing. Due to growing demand for data storage media, various types of personal data storage devices are being developed.

Recently, a solid state disk (SSD) and a memory card employing a flash memory have been widely used as data storage devices replacing a hard disk drive. As a non-volatile memory, a flash memory may retain data stored therein even when power supplied thereto is interrupted. An SSD hardly generates heat and noise during operation and is highly resistant to external shock, thus being evaluated as a data storage device more suitable for a portable device than a conventional hard disk drive and being actively researched to improve the reliability and operating speed thereof.

SUMMARY

Inventive concepts provide a memory system for efficiently managing fail memory dies by replacing a fail memory die with a spare memory die when a memory device includes the fail memory die.

According to some example embodiments of inventive concepts, a memory system may include a first flash domain including a first spare memory die, a second flash domain including a plurality of non-volatile memory dies, a domain distributor configured to generate first data and second data and the domain distributor being configured to generate a first logical address corresponding to the first data and a second logical address corresponding to the second data, and a first redirector. The first redirector may be configured to receive the first data and the second data from the domain distributor and to respectively provide the first data and the second data to the first flash domain and the second flash domain. The first redirector may be configured to provide a part of the second data corresponding to the first fail memory die to the first flash domain, if the second flash domain includes a first fail memory die, such that the first redirector may replace the first fail memory die with the first spare memory die.

According to some example embodiments of inventive concepts, a memory system may include a first flash domain including a first spare memory die, a second flash domain including a plurality of non-volatile memory dies, a domain distributor configured to generate first data and second data and the domain distributor being configured to generate a first logical address corresponding to the first data and a second logical address corresponding to the second data, a first redirector configured to respectively output the first data and the second data to the first flash domain and the second flash domain, a first domain server configured to output the first data to the first redirector, and a second domain server configured to output the second data to the first redirector. The first redirector may be configured to output a part of the second data corresponding to a first fail memory die to the first flash domain, if the second flash domain includes the first fail memory die, such that the first redirector may replace the first fail memory die with the first spare memory die.

According to some example embodiments of inventive concepts, a memory controller may include a domain distributor configured to process data received from a host into a plurality of logical addresses and N data, and a redirector. The plurality of logical address and N data may include a first logical address corresponding to first data and a second logical address corresponding to second data. The redirector may be configured to receive the first and second data from the domain distributor. The redirector may be configured to provide the first and second data to a first flash domain and a second flash domain. The redirector may be configured to recover a part of the first data corresponding to a fail memory die of the first flash domain by migrating the part of the first data to a spare memory die of the second flash domain. In some example embodiments, a memory system may include the memory controller and the first and second flash domains may be coupled to the memory controller.

BRIEF DESCRIPTION OF THE DRAWINGS

Inventive concepts will be more clearly understood from the following detailed description taken in conjunction with the accompanying drawings in which:

FIGS. 5A through 5C are block diagrams showing the concept of migrating a plurality of pieces of data to a spare memory die when a fail memory die appears in a flash domain included in a memory system according to some example embodiments of inventive concepts;

DETAILED DESCRIPTION

Figure 1:
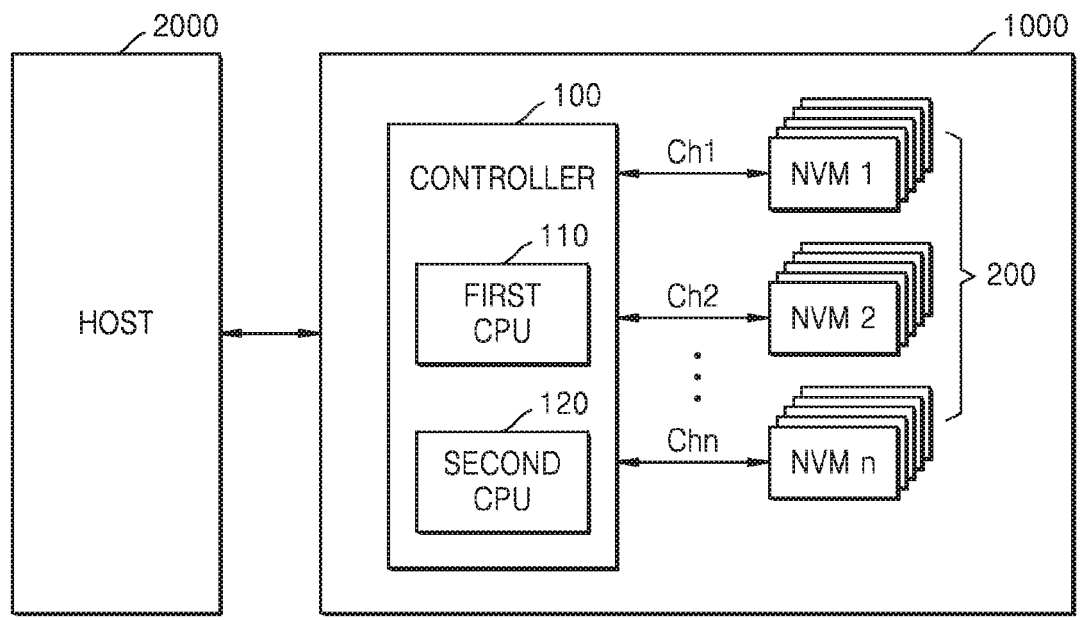
FIG. 1 is a schematic block diagram showing a system including a non-volatile memory system according to some example embodiments of inventive concepts.

FIG. 1 is a schematic block diagram showing a system including a non-volatile memory system according to some example embodiments of inventive concepts.

Referring to FIG. 1, a system 10 may include a host 2000 and a memory system 1000. The memory system 1000 may be a solid state drive (SSD). However, inventive concepts are not limited thereto, and the memory system 1000 may include an embedded multimedia card (eMMC), a universal flash storage (UFS), or a redundant array of independent disks (RAID).

Various devices may be applied as the host 2000, which communicates with the memory system 1000. For example, the host 2000 may be a portable electronic device, such as a portable multimedia player (PMP), a personal digital assistant (PDA), and a smart phone, an electronic device, such as a computer or a high-definition television (HDTV), or application processors installed on the electronic device. The memory system 1000 performs a memory operation of writing or reading data in response to a data access request from the host 2000.

The memory system 1000 may include a controller 100 and one or more non-volatile memory devices 200. The controller 100 may access the non-volatile memory devices 200 via one or more channels. For example, the memory system 1000 may include n channels Ch1 through Chn, and the controller 100 may access the non-volatile memory devices 200 through the n channels Ch1 through Chn. As an example of operation, the controller 100 may access the non-volatile memory devices 200, which respectively correspond to different channels, in parallel.

Each of the non-volatile memory devices 200 may include a flash memory device. However, this is merely an example, and inventive concepts are not necessarily limited thereto. For example, each of the non-volatile memory devices 200 may include a non-volatile memory, such as resistive random access memory (ReRAM), magnetoresistive random memory (MRAM), and phase-change random access memory (PRAM).

The controller 100 may include one or more central processing units (CPUs) for controlling a memory operation according to a request of the host 2000. According to some example embodiments, the controller 100 may include a first CPU 110 for processing an operation related to an interface with the host 2000 and a second CPU 120 for processing an operation related to a memory interface. The first CPU 110 may include one or more CPUs capable of processing requests from the host 2000 in parallel. Furthermore, the second CPU 120 may include one or more CPUs capable of processing accesses to the non-volatile memory devices 200 in parallel.

The first CPU 110 and the second CPU 120 may be included in the memory system 1000 in various ways. For example, the controller 100 may include the first CPU 110 and a plurality of second CPUs 120. Alternatively, the controller 100 may include a plurality of first CPUs 110 and a plurality of second CPUs 120. Furthermore, for example, the first CPU 110 and the second CPU 120 may have a same operating speed or may have different operating speeds. For example, the first CPU 110 may have an operating speed that is twice as fast as that of the second CPU 120.

The first CPU 110 may process a host interface operation according to a first processing unit. Furthermore, the second CPU 120 may process a memory interface operation according to a second processing unit. The first processing unit and the second processing unit may include a first mapping unit and a second mapping unit associated with a unit for accessing data, respectively. The first CPU 110 may process a command from the host 2000 according to the first mapping unit having a certain size and the second CPU 120 may perform a data accessing operation according to the second mapping unit having a size different from that of the first mapping unit.

When each of the non-volatile memory devices 200 includes a flash memory device, the controller 100 may include a flash translation layer (FTL). The FTL may include system software (or firmware) for managing write, read and erase operations regarding the flash memory device and may be loaded to an operation memory inside the controller 100 to be executed by the second CPU 120. The FTL may include a mapping table that includes conversion information between logical addresses and physical addresses.

The first CPU 110 may generate one or more internal commands by processing a data access request provided from a host and transmit the internal commands to the second CPU 120. Furthermore, in the case of a flash memory system, the second CPU 120 may perform an address translating operation or control transmission/reception of data to/from the non-volatile memory devices 200 by driving the FTL. The first CPU 110 may be referred to as a host CPU (HCPU) as the first CPU 110 performs an operation related to an interface with a host, whereas the second CPU 120 may be referred to as an FTL CPU (FCPU) as the second CPU 120 performs an operation for driving the FTL.

According to some example embodiments of inventive concepts, the first mapping unit of the first CPU 110 and the second mapping unit of the second CPU 120 may have different sizes. For example, the first CPU 110 may divide data to be processed according to a command from the host 2000 according to the first mapping unit and generate internal commands according to the divided data. Furthermore, the second CPU 120 may perform an operation for accessing the non-volatile memory devices 200 according to the second mapping unit.

The memory system 1000 according to some example embodiments of inventive concepts may replace a fail memory die in a flash domain including a plurality of non-volatile memory dies with a spare memory die included in another flash domain via a redirector included in the first CPU 110 and a plurality of domain servers that respectively manage the flash domains.

Figure 2:
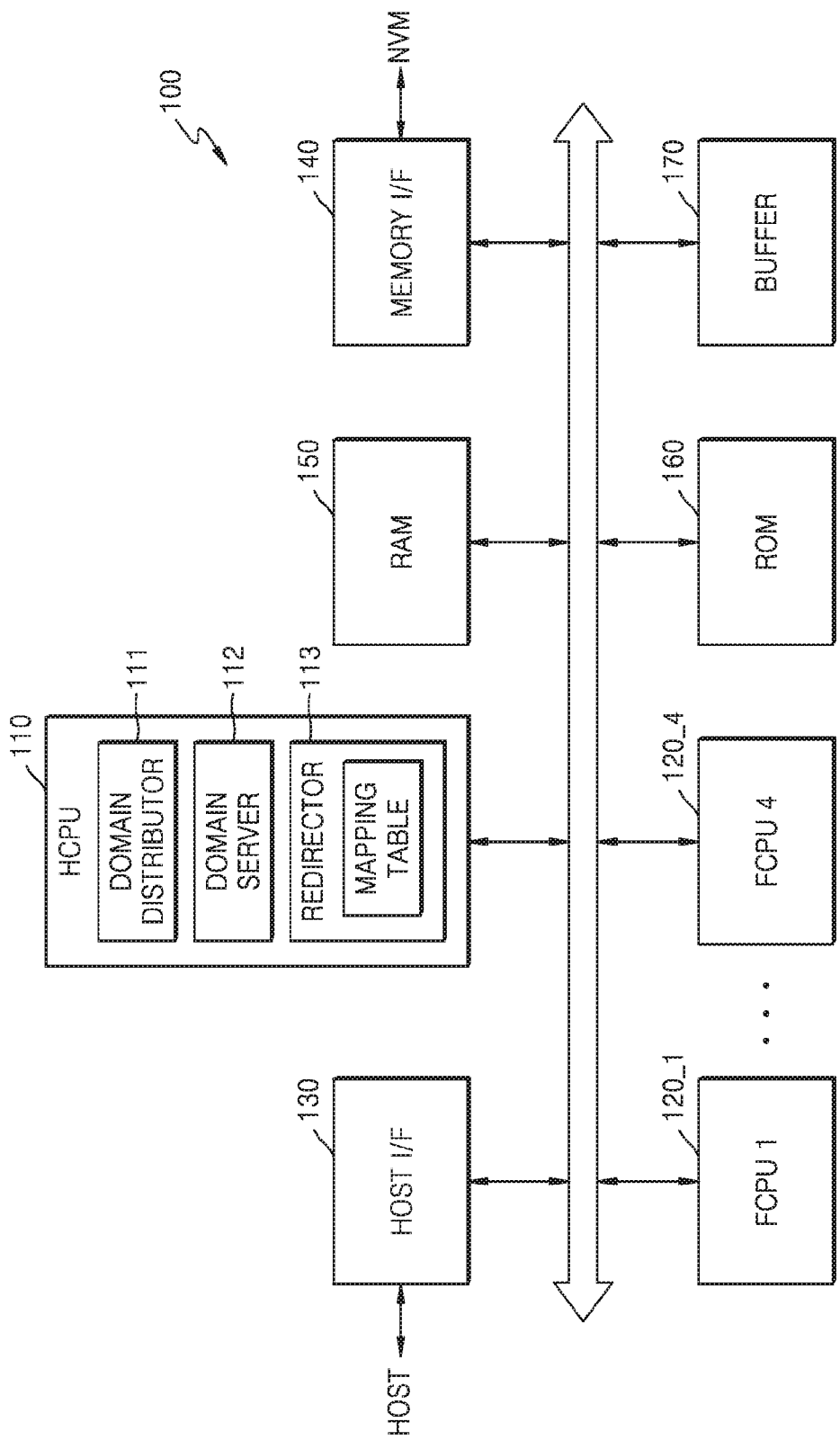
FIG. 2 is a block diagram showing an example of the controller of FIG. 1.

FIG. 2 is a block diagram showing an example of the controller 100 of FIG. 1.

Referring to FIGS. 1 and 2, the controller 100 includes a host CPU (HCPU) 110, a plurality of FTL CPUs (FCPUs), for example, first to fourth FCPUs 120_1 through 120_4, a host interface 130, a memory interface 140, RAM 150, ROM 116, and a buffer 170. For example, an example in which the one HCPU 110 and the first through fourth FCPUs 120_1 through 120_4 are provided in the controller 100 is shown. However, as described above, the controller 100 may be provided with various numbers of HCPUs and FCPUs.

The host interface 130 provides a physical connection between a host and the non-volatile memory system 1000. For example, the host interface 130 may include various types of interfaces, such as an advanced technology attachment (ATA) interface, a serial ATA interface, an external SATA interface, a small computer small interface (SCSI) interface, a serial attached SCSI (SAS) a peripheral component interconnection (PCI) interface, a PCI-Express (EPC) interface, an IEEE 1394 interface, a universal serial bus (USB) interface, a secure digital (SD) card interface, a multimedia card (MMC) interface, and an embedded multimedia card (eMMC) interface.

Meanwhile, the memory interface 140 provides a physical connection between the memory controller 100 and the non-volatile memory devices 200. For example, commands, addresses, and data may be transmitted and received between the memory controller 100 and the non-volatile memory devices 200 through the memory interface 140.

Data requested to be written by the host and data read out from the non-volatile memory devices 200 may be temporarily stored in the buffer 170. The buffer 170 may include a cache, ROM, PROM, EPROM, EEPROM, PRAM, a flash memory, SRAM, or DRAM.

Meanwhile, the RAM 150 may be used as a working memory. In order to control all operations of the controller 100, the HCPU 110 and the first through fourth FCPUs 120_1 through 120_4 may execute firmware, and the firmware may be loaded to the RAM 150. The RAM 150 may include various types of memories and may be embodied as at least one of a cache memory, DRAM, SRAM, PRAM, and a flash memory device. The HCPU 110 and first through fourth FCPUs, when executing the firmware loaded to the RAM 150, may be transformed into special-purpose processor units for controlling one or more operations of the controller 100 and/or memory system 1000.

For example, an FTL of firmware may be loaded to the RAM 150, and various functions may be performed by driving the FTL. For example, the FTL includes a wear-leveling function for managing the wear-level of memory cells and an address converting function for converting logical addresses from the host to physical addresses indicating the physical locations of the memory cells. The ROM 116 may store a booting code used for initially booting a system employing the non-volatile memory system 1000. Furthermore, the ROM 116 may store various codes that may be executed by the HCPU 110 and the first through fourth FCPUs 110_1 to 120_4 to control the overall operation of the controller 100. According to some example embodiments, operations of the HCPU 110 and the first through fourth FCPUs 120_1 through 120_4 for managing mapping units may be performed by executing codes stored in the ROM 116.

The HCPU 110 may divide a command from the host 2000 according to the first mapping unit and generate divided commands (e.g., internal commands). Furthermore, the HCPU 110 may divide the internal commands according to the first mapping unit and transmit the divided internal commands to the first through fourth FCPUs 120_1 through 120_4. The HCPU 110 may include a domain distributor 111, a domain server 112, and a redirector 113.

The first through fourth FCPUs 120_1 through 120_4 may process respectively allocated internal commands, thereby performing a memory accessing operation. In the first through fourth FCPUs 120_1 through 120_4, address converting operations may be performed to convert logical addresses into physical addresses according to the first and second mapping units. For example, the host 2000 may provide a logical address (e.g., the logical address of the host 2000) that indicates where data of a certain size is to be written or read, to the non-volatile memory system 1000.

The HCPU 110 and the first through fourth FCPUs 120_1 through 120_4 may be implemented as a single device and may be functionally distinguished from one another within the single device.

Figure 3A:
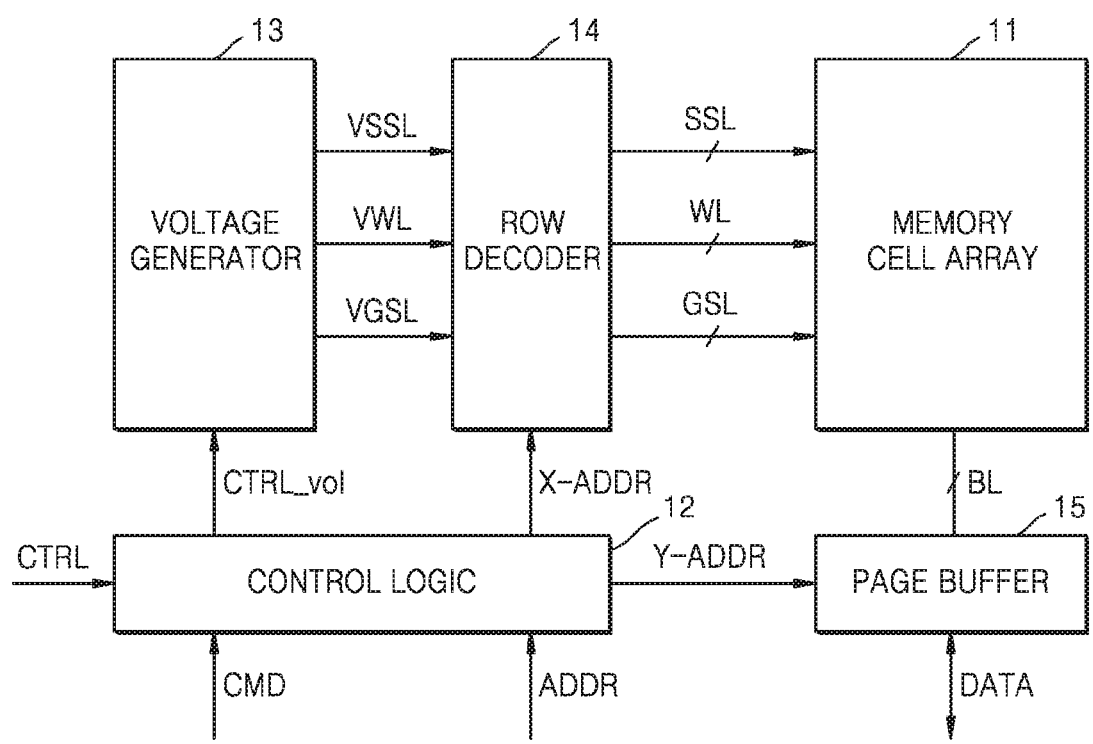
FIG. 3A is an example diagram of a detailed configuration of a non-volatile memory die constituting (and/or including) the non-volatile memory devices shown in FIG. 1.

FIG. 3A is an example diagram of a detailed configuration of a non-volatile memory die constituting (and/or including) the non-volatile memory devices 200 shown in FIG. 1.

Referring to FIG. 3A, each of a plurality of non-volatile memory dies includes a memory cell array 11, a control logic 12, a voltage generator 13, a row decoder 14, and a page buffer 15. In some example embodiments, the memory cell array 11 may include vertical NAND strings that are vertically oriented such that at least one memory cell is located over another memory cell. The at least one memory cell may include a charge trap layer. The following patent documents, which are hereby incorporated by reference in their entirety, describe suitable configurations for three-dimensional memory arrays, in which the three-dimensional memory array is configured as a plurality of levels, with word lines and/or bit lines shared between levels: U.S. Pat. Nos. 7,679,133; 8,553,466; 8,654,587; 8,559,235; and US Pat. Pub. No. 2011/0233648.

The memory cell array 11 may be connected to one or more string select lines SSL, a plurality of word lines WL, and one or more ground select lines GSL and may also be connected to a plurality of bit lines BL. The memory cell array 11 may include a plurality of memory cells MC arranged in areas where the plurality of word lines WL and the plurality of bit lines BL intersect each other.

When an erase voltage is applied to the memory cell array 11, the plurality of memory cells MC are erased. When a program voltage is applied to the memory cell array 11, the plurality of memory cells MC are programmed. Here, each of the memory cells MC may have one of the erase state and the first to $n^{th}$ program states P1 to Pn, which are classified according to threshold voltages.

Here, n may be a natural number equal to or greater than 2. For example, when the memory cell MC is a 2-bit level cell, n may be 3. In another example, when the memory cell MC is a 3-bit level cell, n may be 7. In another example, when the memory cell MC is a 4-bit level cell, n may be 15. In this regard, the plurality of memory cells MC may include multi-level cells. However, inventive concepts are not limited to this, and the plurality of memory cells MC may include single level cells.

The control logic 12 may output various control signals for writing data to the memory cell array 11 or reading data out of the memory cell array 11 in response to a command CMD, an address ADDR, and a control signal CTRL received from the memory controller 210. Therefore, the control logic 12 may control all operations in a flash memory chip.

The various control signals output by the control logic 12 may be provided to the voltage generator 13, the row decoder 14, and the page buffer 15. The control logic 12 may provide a voltage control signal CTRL_vol to the voltage generator 13, may provide a row address X_ADDR to the row decoder 14, and a column address Y_ADDR to the page buffer 15.

At this time, a first driving voltage VWL may be a program voltage (or a write voltage), a read voltage, an erase voltage, a pass voltage, or a program verify voltage. Furthermore, a second driving voltage VSSL may be a string selection voltage, i.e., an ON voltage or an OFF voltage. Furthermore, a third driving voltage VGSL may be a ground selection voltage, that is, an ON voltage or an OFF voltage.

According to some example embodiments, in response to the voltage control signal CTRL_vol, the voltage generator 13 generates a program start voltage as a program voltage when a program loop is initiated, that is, when a program loop counter is 1. Furthermore, the voltage generator 13 may generate a step voltage, which increases step-by-step, from the program start voltage as the number of program loops increases, as a program voltage.

The row decoder 14 is connected to the memory cell array 11 through the plurality of word lines WL and, in response to the row address X_ADDR received from the control logic 12, may activate some of the word lines WL. Specifically, in a read operation, the row decoder 14 may apply a read voltage to a selected word line and apply a pass voltage to an unselected word line.

Meanwhile, in a program operation, the row decoder 14 may apply a program voltage to a selected word line and apply a pass voltage to an unselected word line. According to some example embodiments, in at least one of the program loops, the row decoder 14 may apply a program voltage to a selected word line and an additionally selected word line.

The page buffer 15 may be connected to the memory cell array 11 through the plurality of bit lines BL. In detail, in a read operation, the page buffer 15 operates as a sense amplifier and may output data DATA stored in the memory cell array 11. In a program operation, the page buffer 15 operates as a write driver and may input data DATA to store to the memory cell array 11.

Figure 3B:
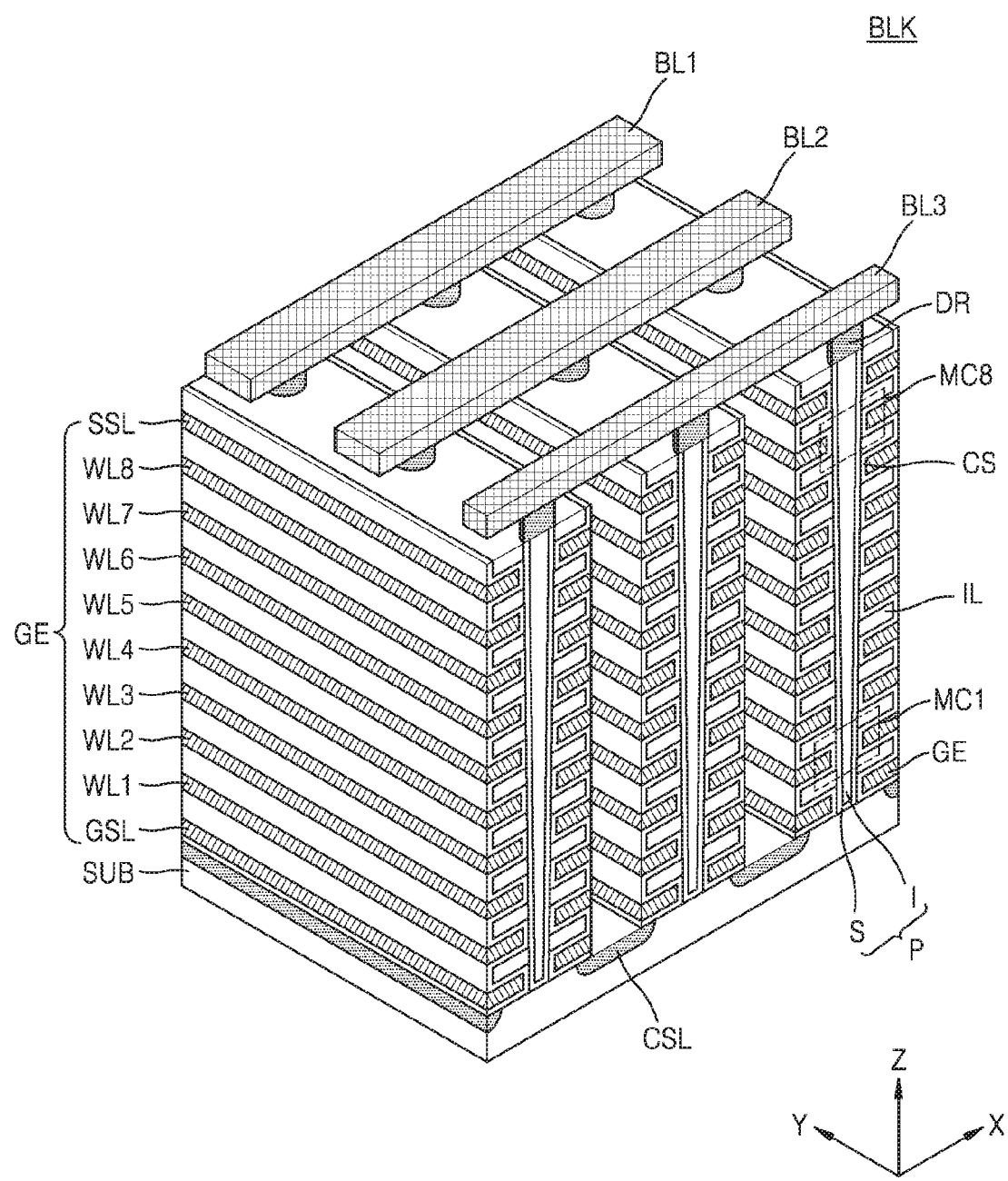
FIG. 3B is an example diagram of a detailed configuration of a memory block constituting (and/or including) the memory cell array shown in FIG. 3A.

FIG. 3B is an example diagram of a detailed configuration of a memory cell block constituting (and/or including) the memory cell array 11 shown in FIG. 3A. Although FIG. 3B shows an example in which a cell block is implemented in 3D form, inventive concepts are not limited thereto, and a cell block may be implemented in 2D form.

Referring to FIG. 3B, a cell block BLK is disposed in a direction perpendicular to a substrate SUB. Although FIG. 3B shows that the cell block BLK includes two select lines GSL and SSL, eight word lines WL1 through WL8, and three bit lines BL1 through BL3, the cell block BLK may include more or less components than these. The cell block BLK may correspond to each of the memory blocks BLK1 through BLKa of FIG. 3B.

The substrate SUB may have a first conductivity type (e.g., p type) and may include common source lines CSL that extend on the substrate SUB in a first direction (e.g., the Y direction). The common source lines CSL may be doped with second conductivity type impurities (e.g., n-type) and may be disposed on the substrate SUB. A plurality of insulating films IL extending in the first direction are sequentially arranged in a third direction (e.g., the Z direction) on a region of the substrate SUB between the two adjacent common source lines CSL, where the plurality of insulating films IL may be a particular distance apart from each other in the third direction. For example, the plurality of insulating films IL may include an insulating material, such as silicon oxide.

A plurality of pillars P, which are sequentially arranged in the first direction and penetrate the plurality of insulation layers IL in the third direction, may be provided on a region of the substrate SUB between the two adjacent common source lines CSL. For example, the plurality of pillars P may penetrate through the plurality of insulating films IL and contact the substrate SUB. In detail, a surface layer S of each of the pillars P may include a silicon material having a first conductivity type and function as a channel region. Meanwhile, an inner layer I of each of the pillars P may include an insulating material, such as silicon oxide, or an air gap.

In a region between the two adjacent common source lines CSL, a charge storage layer CS is disposed along exposed surfaces of the insulating films IL, the pillars P, and the substrate SUB. The charge storage layer CS may include a gate insulating layer (or referred to as a tunnelling insulating layer), a charge trap layer, and a blocking insulating layer. For example, the charge storage layer CS may have an oxide-nitride-oxide (ONO) structure. Furthermore, in the region between the two adjacent common source lines CSL, a gate electrode GE, such as select lines GSL and SSL and the word lines WL1 through WL8, may be disposed on an exposed surface of the charge storage layer CS.

Drains or drain contacts DR may be provided on the plurality of pillars P, respectively. For example, the drains or the drain contacts DR may include a silicon material doped with second conductivity type impurities. Bit lines BL1 through BL3, which extend in a second direction (e.g., the X direction) and are a certain distance apart from one another in the first direction, may be disposed on the drains.

Figure 4:
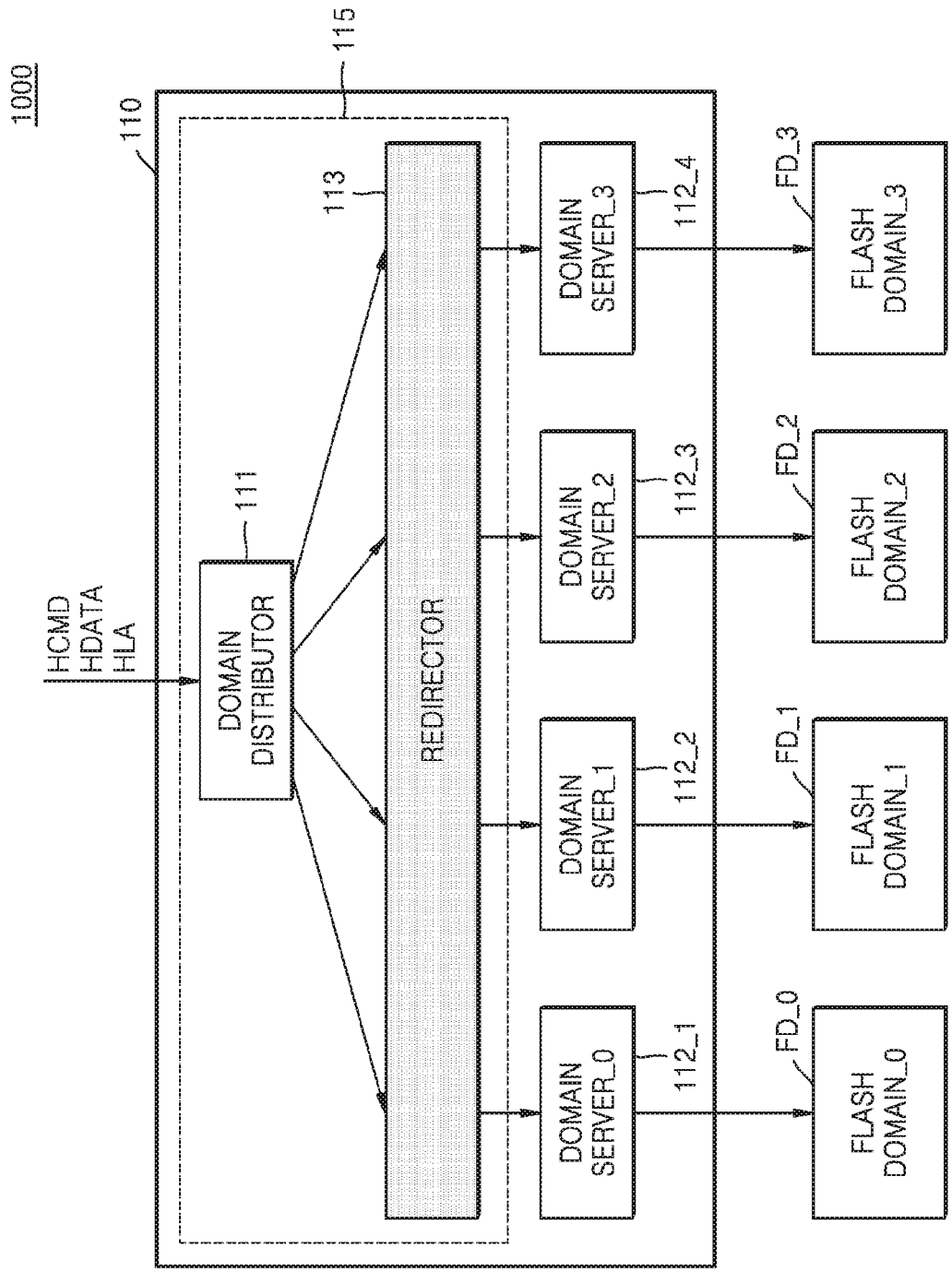
FIG. 4 is a block diagram showing a memory system according to some example embodiments of inventive concepts.

FIG. 4 is a block diagram showing a memory system according to some example embodiments of inventive concepts.

Referring to FIG. 4, the memory system 1000 may include the HCPU 110 and first through fourth flash domains FD_0 through FD-3. The HCPU 110 may include the domain distributor 111, first through fourth domain servers 112_1 through 112_4, and the redirector 113. Although FIG. 4 shows that the memory system 1000 includes four flash domains and four domain servers, inventive concepts are not limited thereto.

The domain distributor 111 may receive a command HCMD, data HDATA, and a logical address HLA from a host. The domain distributor 111 may process the command HCMD from the host and divide the data HDATA into N data (e.g., first through fourth data, where N is an integer greater than 1) and a plurality of logical addresses corresponding to the N data. For example, the domain distributor 111 may generate first through fourth logical addresses indicating the respective logical locations of the divided first through fourth data. The domain distributor 111 may output the first through fourth data and the first through fourth logical addresses to the redirector 113.

The redirector 113 may interconnect the first through fourth domain servers 112_1 through 112_4 and the domain distributor 111. The redirector 113 may transmit first through fourth internal commands, the first through fourth data, and the first through fourth logical addresses received from the domain distributor 111 to the first through fourth domain servers 112_1 through 112_4. When first through fourth flash domains FD_0 through FD_3 do not include a fail memory die, the redirector 113 transmits the first data to the first domain server 112_1, transmits the second data to the second domain server 112_1, transmits the third data to the third domain server 112_3, and transmits the fourth data to the fourth domain server 112_4. The redirector 113 will be described below with reference to FIGS. 5A through 5C.

Although FIG. 4 shows that the domain distributor 111 and the redirector 113 are separate components, inventive concepts are not limited thereto. In some example embodiments, the distributor 115 may be configured to include the domain distributor 111 and the redirector 113, and the distributor 115 may be implemented as a single module. The distributor 115 may be implemented in hardware, software, firmware, or a combination thereof.

For example, in some example embodiments, the domain distributor 111 and/or redirector 113 may be embodied as instructions the HCPU 110 receives from the RAM 150 (see FIG. 2), that when executed by the HCPU 110, configure the HCPU 110 as a special-purpose processor to perform the functions of the domain distributor 111 and/or redirector 113 discussed herein. In some example embodiments, the domain distributor 111 and/or redirector 113 may be embodied as at least one of portion (e.g., cache memory) of the HCPU 110 for storing instructions that when executed by the HCPU 110, configure the HCPU 110 as a special-purpose processor for performing the functions of the domain distributor 111 and/or redirector 113 discussed herein. In some example embodiments, the domain distributor 111 may be embodied as physical portions (e.g., sub processor) of the HCPU 110 that, when executing instructions received from the RAM 150 (see FIG. 2), configure the HCPU 110 as a special-purpose processor for performing the functions of the domain distributor 111 and/or redirector 113 discussed herein.

The first through fourth domain servers 112_1 through 112_4 may receive first through fourth internal commands, first through fourth data, and first through fourth logical addresses from the redirector 113 and output them to the first through fourth flash domains FD_0 through FD_3, respectively. The first through fourth domain servers 112_1 through 112_4 correspond to the first through fourth flash domains FD_0 through FD_3, respectively. The first through fourth domain servers 112_1 through 112_4 may manage the first through fourth flash domains FD_0 through FD_3, respectively.

The first through fourth flash domains FD_0 through FD_3 may include a plurality of non-volatile memory dies connected to a plurality of channels. Furthermore, the first through fourth flash domains FD_0 through FD_3 may include CPUs for managing internal non-volatile memory dies and include memories dedicated to the CPUs, respectively. At this time, the CPUs may be the first through fourth FCPUs 120_1 through 120_4 of FIG. 2.

The first through fourth flash domains FD_0 through FD_3 may receive first through fourth data and first through fourth logical addresses, respectively. The first through fourth flash domains FD_0 through FD_3 may convert the received first through fourth logical addresses into first through fourth physical addresses, respectively, and write the first through fourth data to or read data out of non-volatile memory dies corresponding to the first through fourth physical addresses, respectively. It may be considered that the first through fourth flash domains FD_0 through FD_3 are defined as regions that may be managed by the first through fourth domain servers 112_1 through 112_4, respectively.

The first through fourth flash domains FD_0 through FD_3 will be described below with reference to FIG. 5A.

Figure 5A:
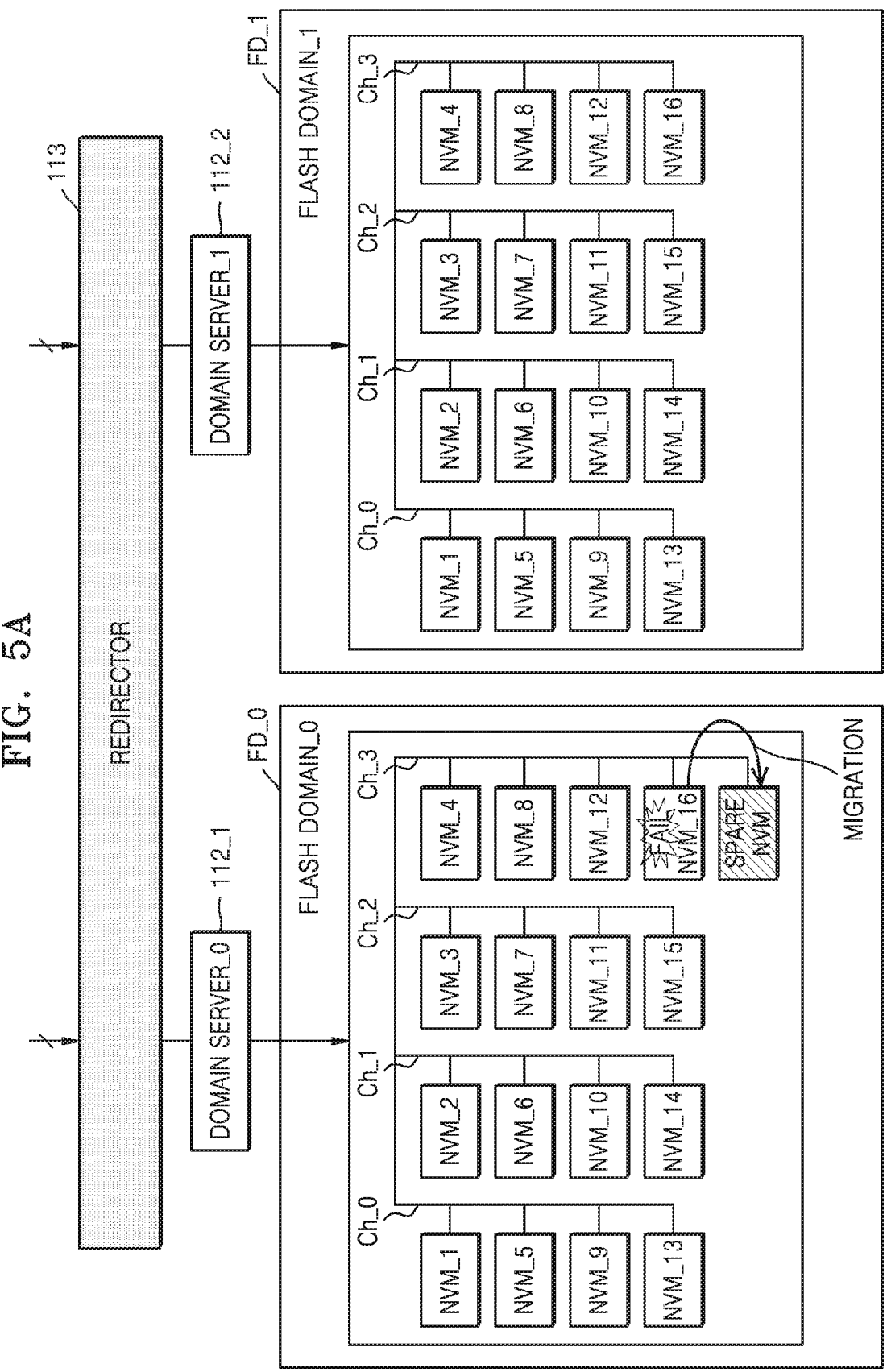
Figure 5C:
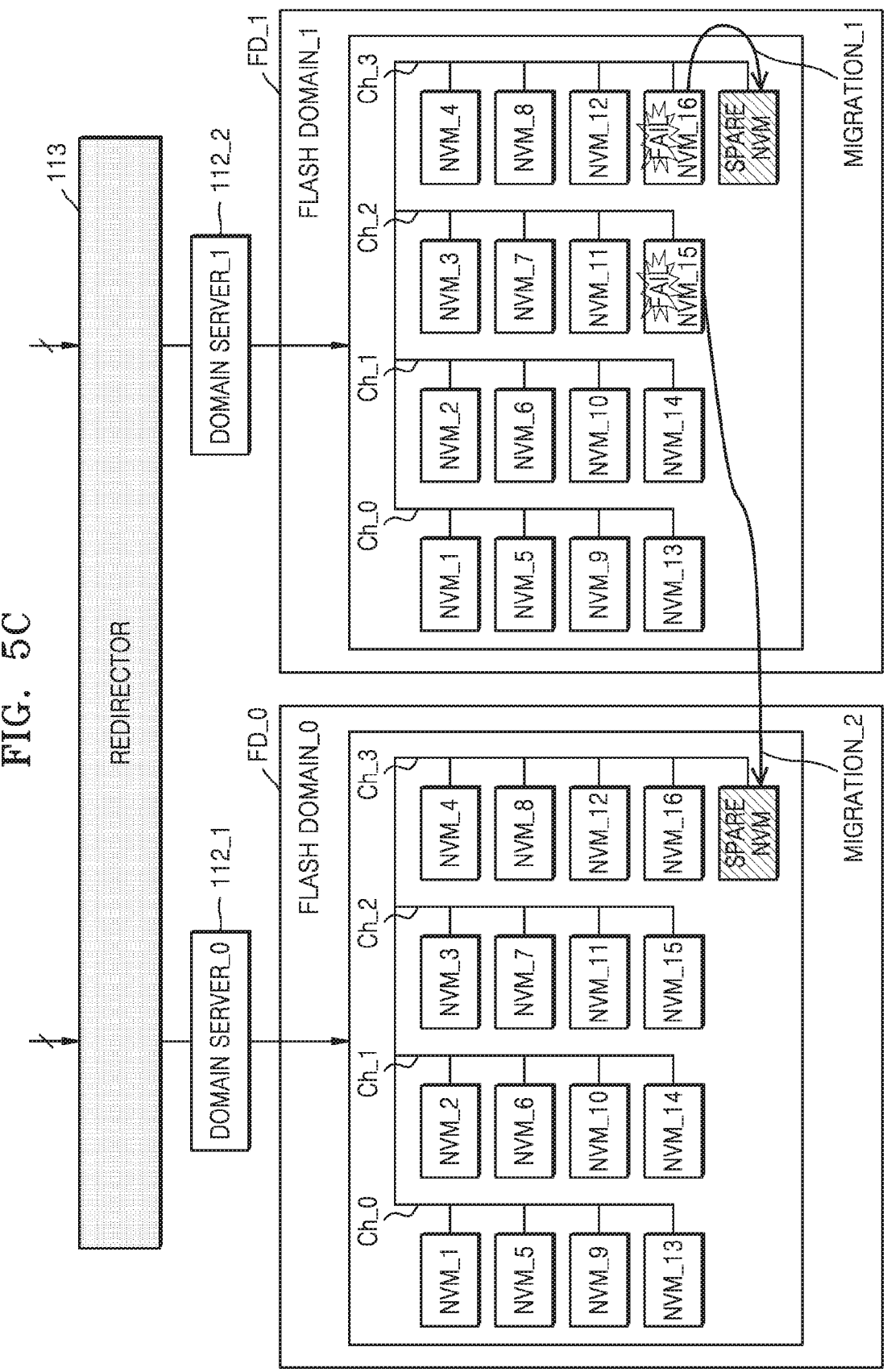

FIGS. 5A through 5C are block diagrams showing the concept of migrating a plurality of pieces of data to a spare memory die when a fail memory die appears in a flash domain included in a memory system according to some example embodiments of inventive concepts. FIGS. 5A through 5C are example diagrams of the redirector, the first flash domain, and the second flash domain of FIG. 4. Descriptions regarding FIGS. 5A through 5C may also be applied to a third flash domain and a fourth flash domain.

Referring to FIGS. 4 and 5A, the first through fourth channels CH_0 through CH_3 may be disposed in each of a first flash domain FD_0 and a second flash domain FD_1. A plurality of non-volatile memory dies may be electrically connected to each of the first through third channels CH_0 through CH_3. Each of the channels CH_0-CH_3 may refer to an independent bus capable of transmitting and receiving commands, addresses, and data to corresponding non-volatile memory dies. Each of non-volatile memory dies connected to different channels may operate independently. A plurality of non-volatile memory dies connected to each channel may form a plurality of ways. For example, four channels and four or five ways may be formed in one flash domain. However, inventive concepts are not limited thereto. A non-volatile memory die may be connected to each way.

A way is a unit for identifying non-volatile memory dies sharing a same channel. Respective flash memory chips may be identified according to channel numbers and way numbers. A non-volatile memory die of a way of a channel to perform a request provided by a host may be determined based on a received logical address.

Each of the first flash domain FD_0 and the second flash domain FD_1 may include first through sixteenth non-volatile memory dies NVM_1 through NVM_16. At least one of the first flash domain FD_0 and the second flash domain FD_1 may additionally include a spare memory die. For example, the first flash domain FD_0 may include a spare memory die, and the second flash domain FD_1 may not include a spare memory die. The first flash domain FD_0 and the second flash domain FD_1 may convert a first logical address and a second logical address received from the first domain server 112_1 and the second domain server 112_2 into a first physical address and a second physical address, respectively. Therefore, the first flash domain FD_0 may include the first FCPU 120_1 of FIG. 2. The second flash domain FD_1 may include the second FCPU 120_2 of FIG. 2, and the first flash domain FD_0 and the second flash domain FD_1 may include a mapping table including conversion information between logical addresses and physical addresses, respectively.

An example of a data migrating operation when a fail appears in the sixteenth non-volatile memory die NVM_16 of the first flash domain FD_0 will be described below.

When a read command for the sixteenth non-volatile memory die of the first flash domain FD_0 is received, data of a read unit and an ECC parity corresponding thereto are read out from the sixteenth non-volatile memory die NVM_16, and an error correcting operation using the ECC parity may be performed. As the sixteenth non-volatile memory die NVM_16 fails, the error correcting operation for the data read out from the sixteenth non-volatile memory die NVM_16 fails, and thus a recovery operation for recovering data stored in the sixteenth non-volatile memory die NVM_16. For example, a RAID recovery may be performed. Other data and RAID parities that constitute a RAID stripe together with the data requested to be read out may be read from a non-volatile memory die other than the sixteenth non-volatile memory die NVM_16 and, in a RAID recovery using the read data and the RAID parity, the data requested to be read by the host may be recovered and the recovered data may be output to the host.

At the same time, the recovered data of the sixteenth non-volatile memory die NVM_16 may be migrated to a spare memory die and stored therein. Furthermore, as the data of the sixteenth non-volatile memory die NVM_16 is migrated to the spare memory die, mapping information indicating the storage location of the data of the sixteenth non-volatile memory die NVM_16 in the first flash domain FD_0 may be changed.

For example, software stored in the RAM 150 of FIG. 2 may include programs for the ECC function, the RAID recovery function, and the data migration function. In other words, the HCPU 110 or the first through fourth FCPUs 120_1 through 120_4 may execute the programs stored in the RAM 150 to perform the RAID recovery function and the data migration function according to the above-described embodiments. However, inventive concepts are not limited thereto, and separate hardware may be configured to perform a RAID recovery function and a data migration function.

Therefore, when a fail memory die appears in a flash domain including a spare memory die, the redirector 113 does not change a first logical address and the first domain server 112_1 and the first flash domain FD_0 may transmit and receive the first data to and from each other. Furthermore, the redirector 113 may allow the second domain server 112_2 and the second flash domain FD_1 to transmit and receive the second data without changing a second logical address.

Referring to FIGS. 4 and 5B, the first flash domain FD_0 may include a spare memory die, whereas the second flash domain FD_1 may not include a spare memory die. An example of a data migration operation when a fail appears at the sixteenth non-volatile memory die NVM_16 of the second flash domain FD_1 will be described below.

As described above with reference to FIG. 5A, by performing a data recovery operation, data of the sixteenth non-volatile memory die NVM_16 of the second flash domain FD_1 may be recovered. The data of the recovered sixteenth non-volatile memory die NVM_16 may be migrated to the spare memory die of the first flash domain FD_0 and stored therein. However, unlike in FIG. 5A, the recovered data may be migrated to the first flash domain FD_0, which is a flash domain different from the second flash domain FD_1 that previously stored the recovered data. Accordingly, the redirector 113 may output the recovered data of the sixteenth non-volatile memory die NVM_16 from the second data received from the domain distributor 111 to the first domain server 112_1, thereby replacing the sixteenth non-volatile memory die NVM_16 of the second flash domain FD_1 with a spare memory die.

Furthermore, as the data of the sixteenth non-volatile memory die NVM_16 of the second flash domain FD_1 is migrated to the spare memory die, some of second logical addresses corresponding to the data of the sixteenth non-volatile memory die NVM_16 may be changed, and mapping information regarding the second logical addresses before and after the change of the second logical addresses may be stored in the mapping table of the redirector 113.

Referring to FIGS. 4 and 5C, each of the first flash domain FD_0 and the second flash domain FD_1 may include a spare memory die. An example of a data migration operation when fails appear at fifteenth and sixteenth non-volatile memory dies NVM_15 and NVM_16 of the second flash domain FD_1 will be described below.

As described above in FIG. 5A, by performing a data recovery operation, data of the fifteenth and sixteenth non-volatile memory dies NVM_15 and NVM_16 of the second flash domain FD_1 may be recovered. The recovered data of the sixteenth non-volatile memory die NVM_16 may be migrated (Migration_1) to a spare memory die of the second flash domain FD_1 and stored therein. The recovered data of the fifteenth non-volatile memory die NVM_15 may be migrated (Migration_2) to a spare memory die of the first flash domain FD_0 and stored therein.

However, unlike in FIG. 5A, the recovered data of the fifteenth non-volatile memory die NVM_15 is migrated to the first flash domain FD_0, which is a flash domain different from the second flash domain FD_1 that previously stored the recovered data. Therefore, the redirector 113 may output the recovered data of the fifteenth non-volatile memory die NVM_15 from the second data received from the domain distributor 111 to the first domain server 112_1, thereby replacing the sixteenth non-volatile memory die NVM_16 of the second flash domain FD_1 with a spare memory die.

Furthermore, as the data of the fifteenth non-volatile memory die NVM_15 of the second flash domain FD_1 is migrated to the spare memory die, some of second logical addresses corresponding to the data of the fifteenth non-volatile memory die NVM_15 may be changed, and mapping information regarding the second logical addresses before and after the change of the second logical addresses may be stored in the mapping table of the redirector 113.

According to some example embodiments of inventive concepts described above with reference to FIGS. 5A through 5C, simultaneously as data recovered through a recovery operation regarding data of a read unit is output to a host, the recovered data may be migrated to a spare memory die. Therefore, the data that is normally recovered in response to a request from the host may be immediately provided to the host and, even when a read operation regarding the fail memory die is requested again, the normal data may be read out from the spare memory die without performing a recovery operation.

Furthermore, even when a spare memory die is not included in each flash domain, a fail memory die appeared in a flash domain that does not include a spare memory die may be replaced with a spare memory die of another flash domain. Therefore, waste of a spare memory die that may appear by including a spare memory die in each flash domain may be limited and/or prevented. Furthermore, even when a plurality of fail memory dies appear in a flash domain, some of the plurality of fail memory dies may be replaced with spare memory dies of other flash domains, and thus fail memory dies may be efficiently managed.

Figure 6:
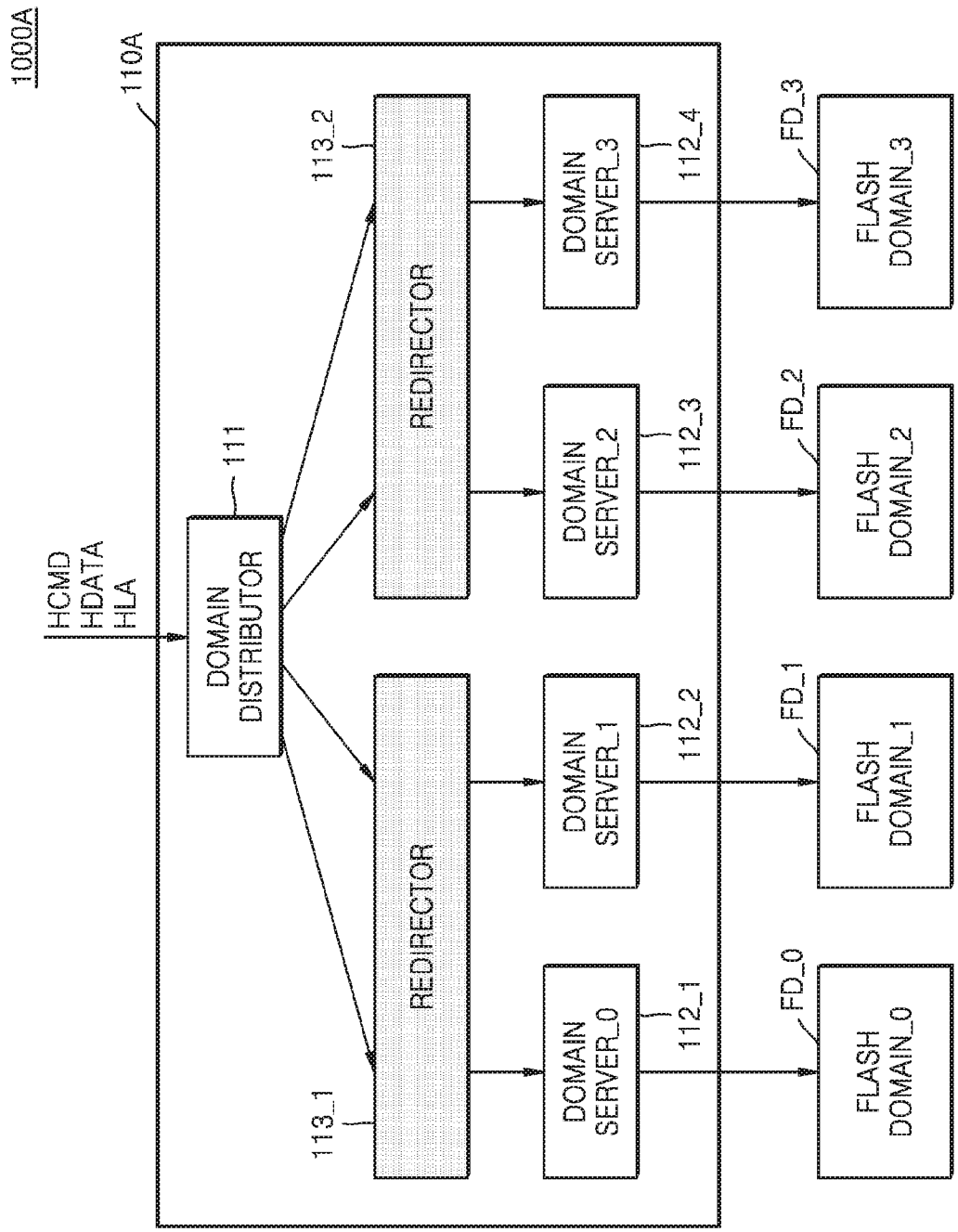
FIGS. 6 through 8 are block diagrams showing memory systems according to some example embodiments of inventive concepts.

FIG. 6 is a block diagram showing a memory system according to some example embodiments of inventive concepts. In FIG. 6, the same reference numerals as in FIG. 4 denote the same elements, and detailed descriptions of the same components will be omitted for simplicity of explanation.

Referring to FIG. 6, a memory system 1000A may include a HCPU 110A and first through fourth flash domains FD_0 through FD-3. The HCPU 110A may include the domain distributor 111, the first through fourth domain servers 112_1 through 112_4, and first and second redirectors 113_1 and 113_2.

The first redirector 113_1 may be connected between the first and second domain servers 112_1 and 112_2 and the domain distributor 111. The first redirector 113_1 may transmit first and second internal commands, first and second data, and first and second logical addresses, which are transmitted from the domain distributor 111, to the first and second domain servers 112_1 and 112_2. When the first and second flash domains FD_0 and FD_1 do not include a fail memory die, the first redirector 113_1 outputs the first data to the first domain server 112_1 and outputs the second data to the second domain server 112_2. Depending on whether the first and second flash domains FD_0 and FD_1 include a fail memory die and whether the first and second flash domains FD_0 and FD_1 include spare memory dies, the first redirector 113_1 may output a part of the second data to the first domain server 112_1 or may output a part of the first data to the second domain server 112_2.

The second redirector 113_2 may be connected between the third and fourth domain servers 112_3 and 112_4 and the domain distributor 111. The second redirector 113_2 may transmit third and fourth internal commands, third and fourth data, and third and fourth logical addresses, which are received from the domain distributor 111, to the third and fourth domain servers 112_3 and 112_4. When the third and fourth flash domains FD_2 and FD_3 do not include a fail memory die, the second redirector 113_2 outputs the third data to the third domain server 112_3 and outputs the fourth domain data to the fourth domain server 112_4. Depending on whether the third and fourth flash domains FD_2 and FD_3 include a fail memory die and whether the third and fourth flash domains FD_2 and FD_3 include spare memory dies, the first redirector 113_1 may output a part of the fourth data to the third domain server 112_3 or may output a part of the third data to the fourth domain server 112_4.

Therefore, the first and second redirectors 113_1 and 113_2 may migrate recovered data to a spare memory die when a fail memory die appears in the first through fourth flash domains FD_0 through FD_3 as described above with reference to FIGS. 5A through 5C. However, inventive concepts are not limited thereto, and the HCPU 110A may include only one of the first and second redirectors 113_1 and 113_2.

Figure 7:
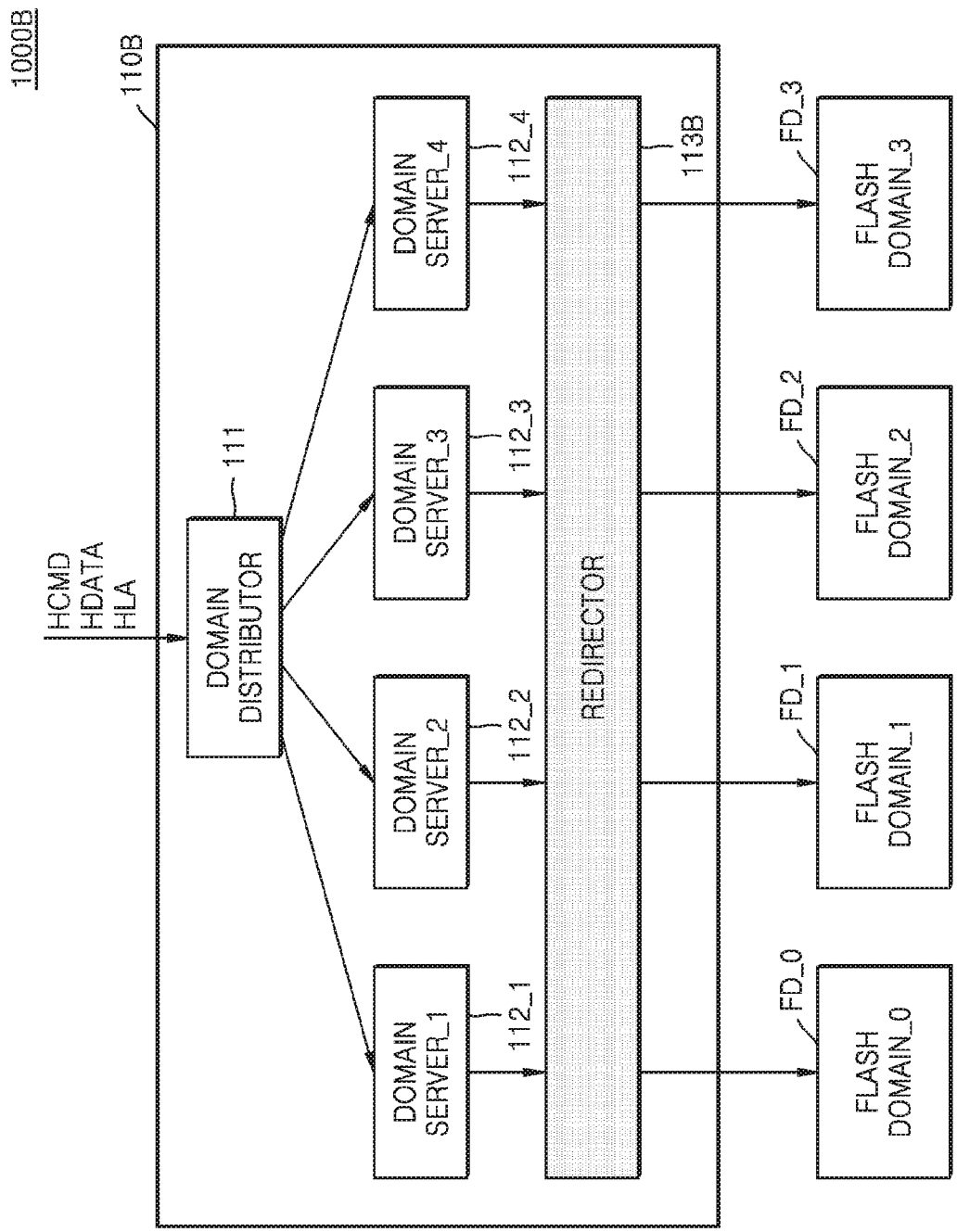

FIG. 7 is a block diagram showing a memory system according to some example embodiments of inventive concepts. In FIG. 7, the same reference numerals as in FIG. 4 denote the same members, and detailed descriptions thereof are omitted here for simplicity of explanation.

Referring to FIG. 7, a memory system 1000B may include an HCPU 110B and the first through fourth flash domains FD_0 through FD_3. The HCPU 110B may include the domain distributor 111, the first through fourth domain servers 112_1 through 112_4, and a redirector 113B.

The domain distributor 111 may output first through fourth internal commands, first through fourth data, and first through fourth logical addresses to the first through fourth domain servers 112_1 through 112_4, respectively. The first through fourth domain servers 112_1 through 112_4 may receive the first through fourth internal commands, the first through fourth data, and the first through fourth logical addresses from the domain distributor 111, respectively, and output the same to the redirector 113B.

The redirector 113B may be connected between the first through fourth domain servers 112_1 through 112_4 and the first through fourth flash domains FD_0 through FD_3. The redirector 113B may transmit the first through fourth internal commands, the first through fourth data, and the first through fourth logical addresses, which are transmitted from the first through fourth domain servers 112_1 through 112_4, to the first through fourth flash domains FD_0 through FD_3. When the first through fourth flash domains FD_0 through FD_3 do not include a fail memory die, the redirector 113B transmits the first data to the first flash domain FD_0, transmits the second data to the second flash domain FD_1, transmits the third data to the third flash domain FD_2, and transmits the fourth data to the fourth flash domain FD_3, respectively.

Depending on whether the first through fourth flash domains FD_0 through FD_3 include a fail memory die and whether the first through fourth flash domains FD_0 through FD_3 include spare memory dies, the redirectors 113B may change some of the first through fourth logical addresses and output some of the first through fourth data to a flash domain different from that in the case no fail memory die is included. Accordingly, when a fail memory die appears in the first through fourth flash domains FD_0 through FD_3 as described above with reference to FIGS. 5A through 5C, the redirector 113B may migrate recovered data to a spare memory die.

Figure 8:
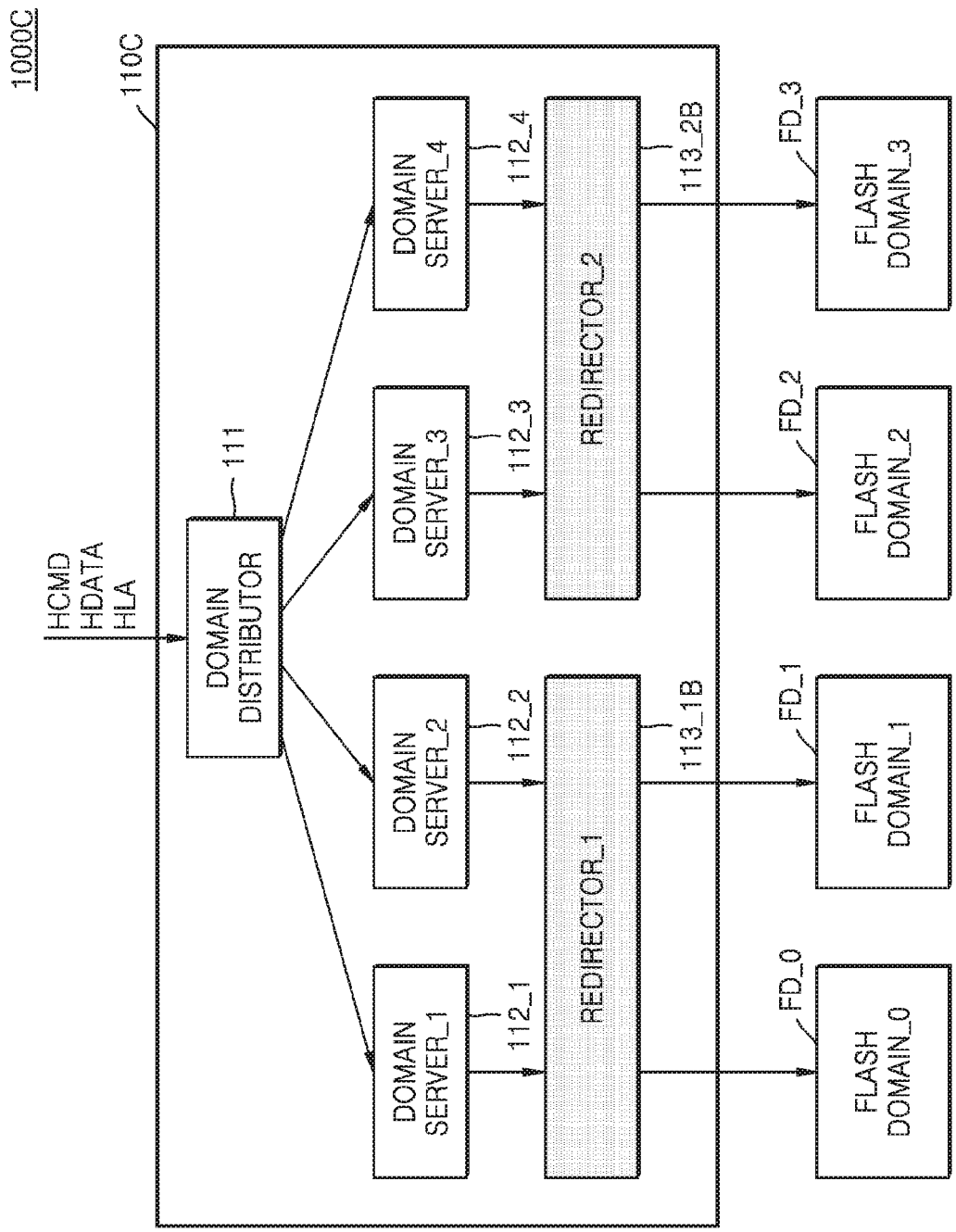

FIG. 8 is a block diagram showing a memory system according to some example embodiments of inventive concepts. In FIG. 8, the same reference numerals as those in FIG. 4 and FIG. 7 denote the same elements, and detailed descriptions thereof are omitted here for sake of simplicity of explanation.

Referring to FIG. 8, a memory system 1000C may include an HCPU 110C and the first through fourth flash domains FD_0 through FD_3. The HCPU 110C may include the domain distributor 111, the first through fourth domain servers 112_1 through 112_4, and first and second redirectors 113_1B and 113_2B.

The first and second domain servers 112_1 and 112_2 may receive first and second internal commands, first and second data, and first and second logical addresses from the domain distributor 111, respectively, and output the same to the redirector 113_1B. The third and fourth domain servers 112_3 and 112_4 may receive third and fourth internal commands, third and fourth data, and third and fourth logical addresses from the domain distributor 111, respectively, and output the same to the second redirector 113_2B, respectively.

When the first and second flash domains FD_0 and FD_1 do not include a fail memory die, the first redirector 113_1 may output the first data to the first flash domain FD_0 and transmits the second data to the second flash domain FD_1. Depending on whether the first and second flash domains FD_0 and FD_1 include a fail memory die and whether the first and second flash domains FD_0 and FD_1 include spare memory dies, the first redirectors 113_1B may output a part of the second data to the first flash domain FD_0 or output a part of the first data to the second flash domain FD_1.

When the third and fourth flash domains FD_2 and FD_3 do not include a fail memory die, the second redirector 113_2B may output the third data to the third flash domain FD_2 and outputs the fourth data to the fourth flash domain FD_3. Depending on whether the third and fourth flash domains FD_2 and FD_3 include a fail memory die and whether the third and fourth flash domains FD_2 and FD_3 include spare memory dies, the second redirector 113_2B may output a part of the fourth data to the third flash domain FD_2 or output a part of the third data to the fourth flash domain FD_3.

Therefore, as described above with reference to FIGS. 5A Through 5C, when a fail memory die appears in the first through fourth flash domains FD_0 through FD_3, the first and second redirectors 113_1B and 113_2B may migrate recovered data to a spare memory die.

However, inventive concepts are not limited thereto, and the HCPU 110C may include only one of the first and second redirectors 113_1B and 113_2B.

Figure 9:
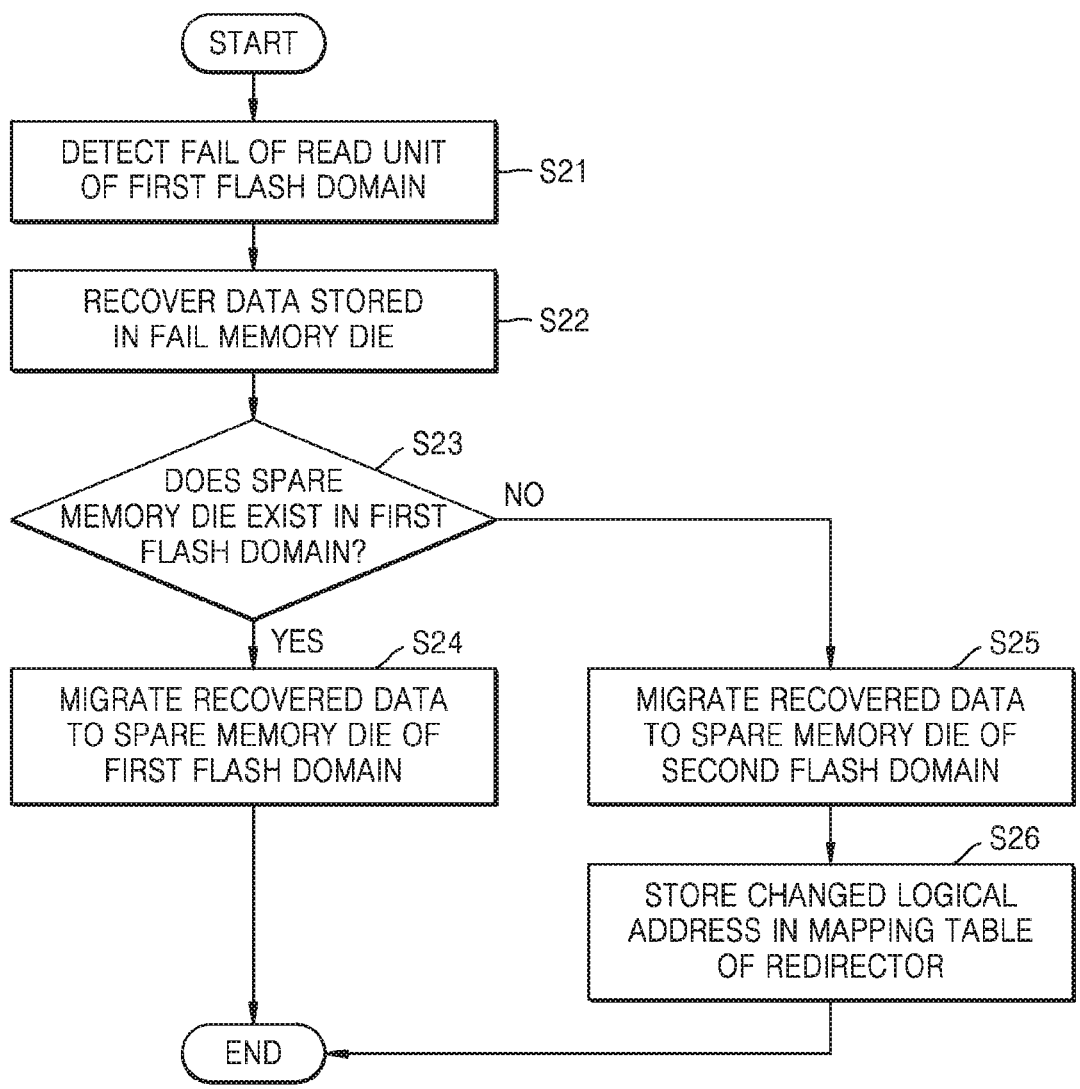
FIG. 9 is a flowchart of a method of operating a memory system, according to various example embodiments of inventive concepts.

FIG. 9 is a flowchart of a method of operating a memory system according to various example embodiments of inventive concepts.

Referring to FIG. 9, when a read command regarding a non-volatile memory die included in a plurality of flash domains is received, data of a read unit and a corresponding ECC parity are read out from the non-volatile memory die, and an error correcting operation using the ECC parity may be performed. When (and/or if) an ECC fail of the read unit regarding a non-volatile memory die included in a first flash domain is detected (operation S21), the error correcting operation regarding read data fails, and thus a recovery operation for recovering data stored in the failed non-volatile memory die may be performed (operation S22). For example, a RAID recovery operation may be performed.

Furthermore, the domain distributor may receive information regarding whether a spare memory die exists from each flash domain and may determine whether a spare memory die exists in the first flash domain (operation S23). Even when a spare memory die exists in the first flash domain, the domain distributor may no longer determine the spare memory die as a spare memory die when other data is already stored therein. For example, the domain distributor may determine a spare memory die is available to store recovered data if the spare memory die has capacity to store the recovered data. The recovered data may be migrated into the available spare memory data.

When a spare memory die exists in the first flash domain, the redirector may transmit recovered data directly to the first flash domain or to a first domain server connected to the first flash domain. Therefore, the recovered data may be migrated to the spare memory die of the first flash domain (operation S24).

When no spare memory die exists in the first flash domain, the redirector receives information regarding a second flash domain including a spare memory die from the domain distributor and may transfer the recovered data either directly to the second flash domain or to a second domain server connected to the second flash domain. Therefore, the recovered data may be migrated to the spare memory die of the second flash domain (operation S25). Information regarding logical addresses changed as the data stored in the non-volatile memory die of the first flash domain is migrated to and stored in the non-volatile memory die of the second flash domain may be stored in the mapping table of the redirector (operation S26).

While some example embodiments of inventive concept have been described, it will be understood that various changes in form and details may be made therein without departing from the spirit and scope of the following claims.

What is claimed is:

1. A memory system comprising:
a first flash domain including a first spare memory die;
a second flash domain, different from the first flash domain, and including a plurality of non-volatile memory dies; and
a processor,
the processor configured to process data received from a host into a plurality of logical addresses and N data,
the plurality of logical addresses and N data including a first logical address corresponding to first data and a second logical address corresponding to second data,
the processor being configured to provide the first data and the second data to the first flash domain and the second flash domain, and
the processor, in response to the second flash domain including a first fail memory die, being configured to provide a part of the second data corresponding to the first fail memory die to the first flash domain such that the processor replaces the first fail memory die with the first spare memory die.

2. The memory system of claim 1, wherein
the processor includes a first domain server and a second domain server,
the first domain server is configured to transmit and receive data to and from the first flash domain, and
the second domain server is configured to transmit and receive data to and from the second flash domain.

3. The memory system of claim 1, wherein, in response to the second flash domain including the first fail memory die, the processor is configured to change the second logical address into a changed second logical address and to store a mapping table including the changed second logical address.

4. The memory system of claim 1, wherein
the second flash domain includes a second spare memory die, and
the processor is configured to receive information indicating whether other data is stored in the second spare memory die and determine whether to provide the part of the second data corresponding to the first fail memory die to the first flash domain.

5. The memory system of claim 1, further comprising:
a controller, wherein
the controller includes the processor, and
the controller is configured to perform a recovery operation for recovering data stored in the first fail memory die using data and redundant array of independent disk (RAID) parities extracted from the plurality of non-volatile memory dies.

6. The memory system of claim 5, wherein
the processor is configured to provide recovered data to the first flash domain, and
the first spare memory die is configured to store the recovered data.

7. The memory system of claim 1, further comprising:
a third flash domain including a plurality of non-volatile memory dies; and
a fourth flash domain including a plurality of non-volatile memory dies.

8. The memory system of claim 7, wherein
the processor is configured to process the data received from the host such that the N data further includes third data and fourth data and the plurality of logical addresses further include a third logical address corresponding to the third data and a fourth logical address corresponding to the fourth data,
the processor is configured to provide the third data and the fourth data to the third flash domain and the fourth flash domain, and
the processor, in response to the third flash domain including a second fail memory die, is configured to provide a part of the third data corresponding to the second fail memory die to the first flash domain, such that the processor replaces the second fail memory die with the first spare memory die.

9. The memory system of claim 7, wherein
the fourth flash domain further includes a second spare memory die,
the processor is configured to process the data received from the host such that the N data further includes third data and fourth data and the plurality of logical addresses further include a third logical address corresponding to the third data and a fourth logical address corresponding to the fourth data,
the processor is configured to provide the third data and the fourth data to the third flash domain and the fourth flash domain, and
the processor, in response to the third flash domain including a second fail memory die, is configured to provide a part of the third data corresponding to the second fail memory die to the fourth flash domain, such that the processor replaces the second fail memory die with the second spare memory die.

10. The memory system of claim 1, wherein the processor is in a single functional module.

11. A memory system comprising:
a first flash domain including a first spare memory die;
a second flash domain, different from the first flash domain, and including a plurality of non-volatile memory dies; and
a processor,
the processor configured to process data received from a host into a plurality of logical addresses and N data,
the plurality of logical addresses and N data including a first logical address corresponding to first data and a second logical address corresponding to second data,
the processor configured to output the first data and the second data to the first flash domain and the second flash domain using a first domain server and a second domain server in the processor, the processor, in response to the second flash domain including a first fail memory die, being configured to output a part of the second data corresponding to the first fail memory die to the first flash domain such that the processor replaces the first fail memory die with the first spare memory die.

12. The memory system of claim 11, wherein each of the first flash domain and the second flash domain include a plurality of channels.

13. The memory system of claim 11, further comprising a third flash domain including a plurality of non-volatile memory dies; and a fourth flash domain including a plurality of non-volatile memory dies, wherein the processor is configured to process the data received from the host such that the N data further includes third data and fourth data and the plurality of logical addresses further include a third logical address corresponding to the third data and a fourth logical address corresponding to the fourth data, the processor further includes a third domain server and a fourth domain server, the processor is configured to output the third data and the fourth data to the third flash domain and the fourth flash domain using the third domain server and the fourth domain server, and the processor, in response to the third flash domain including a second fail memory die, is configured to provide a part of the third data corresponding to the second fail memory die to the first flash domain, such that the processor replaces the second fail memory die with the first spare memory die.

14. The memory system of claim 11, further comprising:

a third flash domain including a plurality of non-volatile memory dies; and a fourth flash domain including a second spare memory die, wherein the processor is configured to process the data received from the host such that the N data further includes third data and fourth data and the plurality of logical addresses further include a third logical address corresponding to the third data and a fourth logical address corresponding to the fourth data, the processor further includes a third domain server and a fourth domain server, the processor is configured to output the third data and the fourth data to the third flash domain and the fourth flash domain using the third domain server and the fourth domain server, and the processor, in response to the third flash domain including a second fail memory die, is configured to provide a part of the third data corresponding to the second fail memory die to the fourth flash domain, such that the processor replaces the second fail memory die with the second spare memory die.

15. The memory system of claim 11, wherein the memory system is a solid state drive (SSD).

16. A memory controller comprising:

a processor configured to process data received from a host into a plurality of logical addresses and N data, the plurality of logical addresses and N data including a first logical address corresponding to first data and a second logical address corresponding to second data, the processor being configured to provide the first data and the second data to a first flash domain and a second flash domain, the second flash domain being different from the first flash domain and including a plurality of non-volatile memory dies, the processor being configured to recover a part of the first data corresponding to a fail memory die of the first flash domain by migrating the part of the first data to a spare memory die of the second flash domain.

17. The memory controller of claim 16, wherein the processor is configured to transmit and receive the data to and from the first flash domain, and the processor is configured to transmit and receive the data to and from the second flash domain.

18. The memory controller of claim 16, wherein the processor is configured to determine whether a first spare memory die exists in the first flash domain, the spare memory die of the second flash domain is a second spare memory die, the processor is configured to migrate the part of the first data to the second spare memory die if the first spare memory die does not exist in the first flash domain, and the processor is configured to migrate the part of the first data to the first spare memory die if the first spare memory die exists in the first flash domain.

19. A memory system comprising:

the memory controller of claim 16; and a memory including the first and second flash domains.

* * * * *